Sept. 10, 1974  F. X. GALNEDER  3,835,020
ELECTRICAL TERMINATION MEANS AND ELECTRODE SPACING
MEANS FOR MAINTAINING A UNIFORM ELECTRODE GAP
Filed Feb. 9, 1973

United States Patent Office 3,835,020
Patented Sept. 10, 1974

3,835,020
ELECTRICAL TERMINATION MEANS AND ELECTRODE SPACING MEANS FOR MAINTAINING A UNIFORM ELECTRODE GAP
Frank X. Galneder, 5639 E. Pittman St., Simi Valley, Calif. 93063
Filed Feb. 9, 1973, Ser. No. 331,303
Int. Cl. B01k *3/00, 3/08*
U.S. Cl. 204—268
12 Claims

ABSTRACT OF THE DISCLOSURE

An electrolytic cell comprising a non-conductive chamber, housing a plurality of graphite electrodes, having been subjected to a pretreament, including submersion in a metallic chloride solution, and arranged, vertically, as a unit, between two baffle plates in said chamber, each of said electrodes constituting an oppositely located anode and cathode, said electrolytic cell being provided with automatically adjusting means, consisting of external pressure means coacting with non-conducting spacing means between individual electrode pairs, for the maintenance of a constant predetermined individual spacing between any two of said electrodes in the chamber.

CROSS REFERENCES TO RELATED APPLICATIONS

None.

SUMMARY OF THE INVENTION

This invention refers to a flow-through type electrolysis chamber for the production of chlorine, oxygen and hydrogen being primarily suitable for the automatic chlorination of swimming pools and disinfection of drinking water, and requiring during prolonged periods of time, only a minimum of maintenance and supervision.

The electrolytic cell comprises a non-conducting housing having two baffle plates situated, respectively, in the upper and lower portion of the housing. The electrodes are mounted fittingly between the two baffle plates, which prevent any vertical movements thereof, however, without restricting their horizontal displacements; this arrangement constitutes an important aspect of my invention, as will be explained further on in more detail.

The lower baffle plate is mounted fixedly but easily detachable, within the housing, and serves as a resting floor for the electrodes, while the upper baffle plate is simply placed on top of the electrodes in the housing, and may, thus, be adjustably raised or lowered, to adjustably accommodate a variety of dimensions of electrodes. The electrodes are made of graphite or other carbon material, which have been subjected to a pretreatment, including submersion in a solution of metallic chloride e.g. cobalt chloride, energizing and subsequent impregnation with a wax hardener. The electrodes are bi-polar, i.e., one side of each electrode constitutes the anode, the opposite side being the cathode. The correct electrode gap between respective electrodes, initially set on their mounting in the chamber, is maintained automatically by the means of a self-adjusting spacer system, comprising external but inwardly exerting pressure means coacting with spacing means arranged adjustably between any two electrodes system, thereby, securing the constant maintenance of the initial cell voltage.

BACKGROUND OF THE INVENTION

The applicant calls attention to the following prior U.S. Letters Patent:

| | | |
|---|---|---|
| Antropoff | 1,547,539 | July 28, 1925. |
| Marinos | 2,507,400 | May 9, 1950. |
| Haas | 3,436,324 | Apr. 1, 1969. |
| Colvin | 3,476,675 | Nov. 4, 1969. |
| Gwynn | 3,479,275 | Nov. 18, 1969. |
| Schneider | 3,546,089 | Dec. 8, 1970. |
| Goens | 3,598,715 | Aug. 10, 1971. |

Antropoff discloses impregnating graphite electrodes with oil and saponifiable substances.

Marinos refers to a corrosion-resistant treatment of metals by means of a protective coating.

Haas discloses a metallic electrolysis chamber provided with a protective cover of post-chlorinated polyvinal chloride.

Colvin, Gwynn, Schneider and Goens disclose sodiumchlorate electrolytic cell swimming pool water conditioner, using platinum anodes, higher voltage and current, and platinized titanium anodes, respectively.

However, none of the above developed references refers to metallic chloride pre-treated unit of graphite electrodes, provided with self-adjusting means for constant peak performance, during the life of the electrodes.

DESCRIPTION OF THE INVENTION

The disinfection process of water as it is known, is initiated by causing the water to flow through the electrode chamber. The small amounts of sodium chloride (common salt) in the water brings about the electrolyte. When the electrodes are energized by way of a conventional DC power source, the current, flowing between the electrodes, causes the water to separate into its basic elements of hydrogen and oxygen. The sodium chloride is simultaneously separated into sodium and chlorine. The release of the pure chlorine dissolves rapidly in the water, oxidizing all organic matter. The highly corrosive environment, present in the electrolysis process, demands an electrode material which is totally inert to oxygen and chlorine attack. The material primarily known today, as being capable of withstanding this environment, is platinum. The precious metal, however, is far too expensive to be used in solid form or as a coating material for such purposes. Carbon or graphite as such is also, to some extent, resistant to oxidation and chlorine attack, but deteriorates rather rapidly with the presence of water due to oxidation absorption and swelling, although these materials are inexpensive.

Thus, it is the primary object of the invention to provide a chlorinating electrolytic cell using inexpensive, specially pre-treated long lasting electrodes made of graphite material, instead of the conventionally used platinum or platinum foil.

It is a further object of the invention to provide automatic adjusting means to maintain a predetermined constant gap between the individual electrodes, being essential to the continued operation of the graphite electrodes, so as to prevent the increase of the initially set cell voltage. Such excess cell voltage—where present due to the increased oxygen evolution at the anode—would cause a rapid break down of the conventional graphite electrodes, and thus a considerable shortening of their operative life.

It is still a further object of the invention to provide a compact electrolysis chamber of simple construction, capable of continuous operation during prolonged periods of time without manual maintenance or adjustment.

The invention also comprises novel details of construction and novel combinations and arrangements of parts, which will more fully appear in the course of the following description, which is based on the accompanying drawings. However, said drawings merely show, and the following description merely describes, preferred embodiments of the present invention which are given by way of illustration or example only.

In the drawing, like reference characters designate similar parts in the several views.

Figure 1:
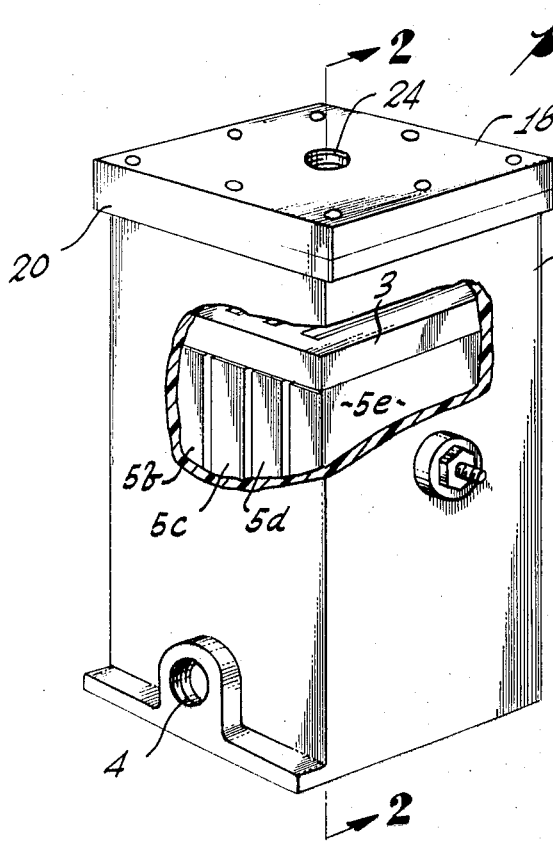
FIG. 1 is a partially broken, perspective view of the electrolytic cell.
Figure 2:
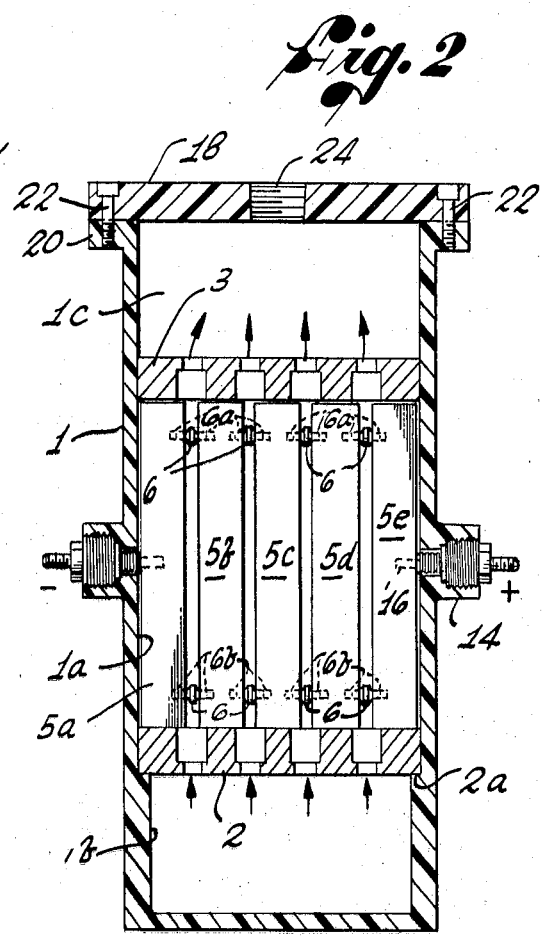
FIG. 2 is a cross-sectional view, along the line 2—2 of FIG. 1.
Figure 4:
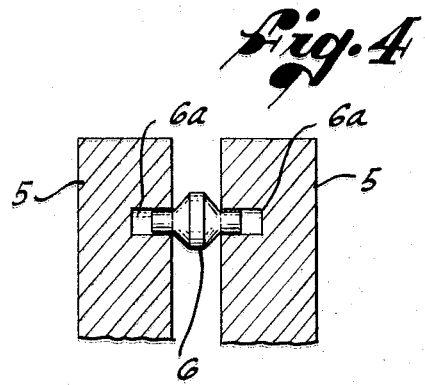
FIG. 4 is an enlarged sectional view of the non-conducting spacing means mounted between the electrodes.

As illustrated in the drawings, particularly FIGS. 1 and 2, the electrolytic cell comprises a molded non-conductive housing 1, divided into an electrode chamber 1a and sub-chambers 1b and 1c, by means of lower and upper perforated baffle plates 2 and 3, respectively; sub-chamber 1b is adapted to form a separate compartment in order to slow or minimize the turbulence of the water flowing through an electrolysis chamber 1a. Sub-chamber 1b is furthermore provided with a threaded inlet portion 4 (FIG. 1) which constitutes the connecting means between incoming fluid and housing 1. The lower baffle plate 2 rests firmly on recesses 2a, provided in the internal walls of housing 1. Each of the electrode plates 5, thusly placed between baffle plates 2 and 3, is provided with two sets of three triangularly spaced holes 6a and 6b, which lie flush with the corresponding holes 6a, 6b of an adjacent electrode plate, in order to be able to pre-assemble as a unit all the electrodes 5 within the housing 1 by means of tapering non-conducting spacers 6, which are, thus, insertable in the oppositely located sets of holes 6a, 6b of any two adjacent electrode plates 5. Thus, the electrode plates 5, prior to their insertion in the housing 1, form an integral "pack" which, on being inserted, will rest on the lower baffle plate 2, without receiving any additional support in the housing. The upper baffle plate 3, as noted, is simply placed on top of the electrode pack, comprising electrodes 5a to 5e, thus preventing any vertical displacement of the electrode pack. By virtue of the loosely arranged baffle plate 3, it will be possible to use variable lengths of electrode plates within housing 1. The spacers 6 will maintain their proper predetermined spacing between the individual electrodes 5. The special tapering form of spacers 6, as illustrated in FIG. 4, will permit the constancy of the initially set electrode gap between each pair of electrodes 5, and, at the same time, provide exposure to wear around the areas of holes 6a, 6b.

Figure 3:
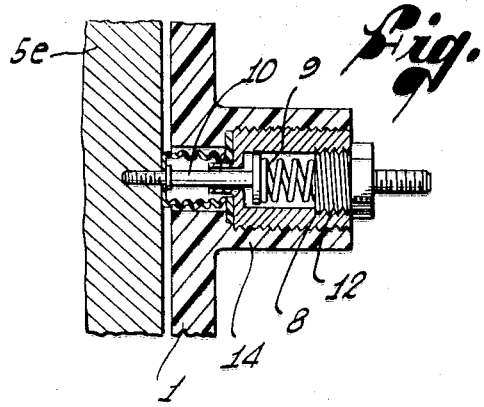
FIG. 3 is an enlarged sectional view of the externally disposed pressure means for maintenance of proper spacing between the electrodes.

As the surfaces of electrodes 5 wear off, as a result of their being used for the stated objectives of the invention, the spacers 6 will automatically reset their positions, coacting with two terminal plungers 10, mounted oppositely one another in the housing 1 and exerting adequate inwardly horizontal pressures on the electrodes 5, by means of compression spring 9; the spring 9 is mounted between the plunger 10 and a terminal shaft 12, as illustrated in FIG. 3, and will assure the maintenance of proper pressure on and, thus, the predetermined gap between electrodes 5.

Whenever there is a sufficient wear of graphite material in the electrodes, the pressure of plunger 10 will exert itself on the electrodes 5, so as to cause the latter to move horizontally inwardly by the distance vacated by the worn off graphite, but will prevent the space between the electrode pairs from diminishing by virtue of the adaptable spacers 6.

As illustrated in FIG. 3, a neoprene diaphragm 14 provides a fluid-tight seal for and around pressure plunger 10, shaft 12, and threaded insert 8, into which the latter is threaded, preventing fluid from escaping thereinto and, at the same time, securing the unhindered inward horizontal movement of the terminal plunger 10 as the graphite material wears down during the operation of the electrolysis chamber. A contact screw 16, anchored in the outer electrodes 5a and 5e, provide, via terminal plunger 10, the electrical connection to said outer electrodes.

A gasket 18, made e.g. of butyl rubber provides a fluid-tight seal for top cover 20, which is removable and maintained securely in place by screws 22.

A threaded opening 24 is arranged in the top cover 20, above sub-chamber 1c, serving as an outlet for the fluid, being discharged, after having passed through the electrolysis chamber.

The electrolytic cell, according to the invention, operates on D.C. current, which reverses its polarity automatically at predetermined intervals, in order to prevent calcium deposits from building up on the electrodes. A substantially constant maximum cell voltage of approximately 4.2 volt, with a current density of 100–200 milliamperes per sq. inch of electrode surface, is maintained in each electrolysis compartment for the proper functioning of the device.

As already noted, each of the electrodes is bi-polar, i.e., each of the vertically arranged electrode plates form a self-contained electrolysis compartment. Only the first and last electrode are electrically connected, consecutive voltage drops occur in each of the individual electrolysis compartments, as the current passes from a positive terminal, through the electrolyte and the intermediary unterminated electrodes, to the last electrode with the negative terminal. Thus, each electrode plate, containing within itself oppositely disposed positive and negative poles, constitutes a dividing electrolysis compartment in a chain of alternating positive and negative surfaces. In other words, each electrode simultaneously performs the functions of an anode and a cathode, with oxygen and chlorine evolution on one side thereof, and hydrogen evolution on the opposite side.

Such an arrangement reduces any undesirable overvoltage within the electrolysis chamber to a minimum polarization occurring only at the surface of the electrodes.

The graphite electrodes are of medium density, preferably ½ inch in thickness and having a length of 5–6 inches, each side of the electrode plate having an active surface area of 20 to 35 sq. inches. However, the numbers and size of the electrodes may vary within wide ranges, as illustrated in FIG. 2, e.g., five electrodes, as an integral unit or pack, may be placed loosely within the housing, thus, forming 4 individual compartments. Prior to the insertion of the electrode pack 5a, b, c, d, e, the electrodes are submerged in a tank containing a series of iron anodes and a 5–25% solution of cobalt chloride and also containing chromic acid, and thoroughly saturated therein for about 10 to 15 minutes. The graphite electrodes, to be further treated are then connected to the negative pole of a D.C. power supply, of e.g. 15 volt, being arranged in the tank in such a manner, that each graphite plate will oppose an iron anode. The plates are then energized for a period of about 3 minutes at a current density of .5 amp/inch$^2$. The metallic chloride penetrates into the pores of the graphite material, and, as a result of the electrolysis process, deposits itself there as an insoluble chromate layer, causing the graphite material to become inert to chlorine and oxidation attacks. After this treatment the graphite electrodes are removed and oven dried to evaporate all absorbed moisture. Following the drying period, said electrodes are submerged in a molten wax hardener, such as stearine, until thoroughly impregnated; this completes the treatment which greatly improves oxidation resistance, and prevents water absorption. The electrolytic cell is installed, in a conventional manner, adjacent the water to be disinfected, the power supply is then turned on, preferably controlled by a sequence timer, or a similar control device, for the purpose of maintaining a desirable rate of chlorine production.

The electrolysis chamber, according to the invention, is capable of producing .5 p.p.m. to 10 p.p.m. chlorine per gallon of water/minute, and will automatically retain the chlorine residue required for any swimming pool throughout the year at a very low power consumption.

Having thus described the invention, what is claimed and desired to be secured by Letters Patent is:

1. In an electrolytic cell for production of chlorine, oxygen and hydrogen, comprising
   (a) a housing;
   (b) a first baffle means mounted within the lower portion of said housing;
   (c) a plurality of adjacently situated electrodes resting on said first baffle means;
   (d) second baffle means resting on top of said electrodes, within the upper portion of said housing;
   (e) electrical contact means mounted in the first and last of said electrodes;
   (f) resilient electrical termination means mounted in the opposite walls of said housing, for exerting pressure on said contact means;
   (g) non-conducting spacing means mounted in and between each pair of electrodes co-acting adjustably with said termination means to maintain a uniform electrode gap;
   (h) an aperture arranged in the lower portion of said housing for inlet of fluid;
   (i) an aperture arranged in the upper portion of said housing for the outlet of the chlorinated fluid.

2. An electrolytic cell, as defined in Claim 1, in which each of the intermediary electrodes is bi-polar, containing an anode and cathode.

3. An electrolytic cell, as defined in Claim 1, in which said electrodes are assembled by means of said spacing means, so as to form an integral unit prior to their insertion in said housing.

4. An electrolytic cell, as defined in Claim 1, in which said spacing means are tapering so as to expose to wear the surfaces of said electrodes, adjacent said spacing means.

5. An electrolytic cell, as defined in Claim 1, in which an elastic diaphragm provides a fluid tight seal around said termination means.

6. An electrolytic cell, as defined in Claim 1, in which said resilient termination means consists of a plunger, a spring acting thereon, and support means for said spring.

7. An electrolytic cell, as defined in Claim 6, in which said plunger acts as an electrical terminal for said electrical contact.

8. An electrolytic cell, as defined in Claim 1, in which only the first and last of said electrodes contain electrical contact means, so as to cause the current to pass through the electrolyte and the intermediary electrodes.

9. An electrolytic cell, as defined in Claim 1, in which said electrodes are made of carbon.

10. An electrolytic cell, as defined in Claim 9, in which said electrodes consist of graphite plates.

11. An electrolytic cell, as defined in Claim 9, in which said carbon electrodes are submerged in a solution of a metallic chloride, to saturate the electrodes, and then electrolyzed as cathodes in said solution, prior to their insertion in said housing.

12. An electrolytic cell, as defined in Claim 11, in which said metallic chloride is cobalt chloride.

References Cited
UNITED STATES PATENTS 1,097,826    5/14    Townsend et al. _____ 204—266

JOHN H. MACK, Primary Examiner

W. I. SOLOMON, Assistant Examiner

U.S. Cl. X.R.

204—149, 270, 278, 294